United States Patent
Kirshenbaum

(10) Patent No.: US 7,634,450 B2
(45) Date of Patent: Dec. 15, 2009

(54) SYSTEM AND METHOD FOR DETERMINING DIFFICULTY MEASURES FOR TRAINING CASES USED IN DEVELOPING A SOLUTION TO A PROBLEM

(75) Inventor: Evan Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1004 days.

(21) Appl. No.: 10/734,459

(22) Filed: Dec. 12, 2003

(65) Prior Publication Data

US 2005/0130109 A1 Jun. 16, 2005

(51) Int. Cl.
*G06N 3/12* (2006.01)
(52) U.S. Cl. .......................................... 706/13; 706/45
(58) Field of Classification Search .................... 706/12
See application file for complete search history.

(56) References Cited

OTHER PUBLICATIONS

Evan Kirshenbaum. Modeling Disk Arrays Using Genetic Programming. HP Laboratories Technical Report HPL-2002-20, Jan. 29, 2002.*

Liu et al ("Improving Genetic Classifiers with a Boosting Algorithm" 2003).*
Hitoshi Iba ("Bagging, Boosting, and Bloating in Genetic Programming" 1999).*
Nock et al ("A boosting-based prototype weighting and selection scheme" 2000).*
Paris et al (Applying Boosting Techniques to Genetic Programming Jan. 2002).*
Freund et al "A Short Introduction to Boosting" 1999.*
Evan Kirshenbaum, Modeling Disk Arrays Using Genetic Programming, Jan. 29, 2002, pp. 1-9.

* cited by examiner

*Primary Examiner*—David R Vincent
*Assistant Examiner*—Lut Wong

(57) ABSTRACT

An approach for solving a problem involves modifying difficulty measures of training cases used to develop candidate solutions. A set of candidate solutions and a set of training cases are provided. Each of the training cases is associated with a difficulty measure. A candidate solution is operated on a particular training case and a performance measure for the candidate solution is obtained. A credibility rating for the candidate solution may be determined. The credibility rating is indicative of a degree to which the performance measure represents a good estimator of the difficulty measure of the particular training case. The difficulty measure of the particular training case may be modified based on the performance measure and the credibility rating of the candidate solution. The difficulty measure of the selected training case may be modified based on the performance measures.

23 Claims, 5 Drawing Sheets

SYSTEM AND METHOD FOR DETERMINING DIFFICULTY MEASURES FOR TRAINING CASES USED IN DEVELOPING A SOLUTION TO A PROBLEM

FIELD OF THE INVENTION

The present disclosure generally relates to an approach for selecting training cases used to develop a solution to a problem.

BACKGROUND

In machine learning, the goal is typically to develop a solution to a problem. The solution may involve a numeric prediction, as in the prediction of the throughput of a certain type of device given some parameters that characterize workload. The problem may represent a discrete classification, such as whether a credit card charge is fraudulent, or what disease is causing a particular set of observed symptoms. One way of developing such solutions involves a set of training cases.

Machine learning may be performed using evolutionary computation, an umbrella term encompassing primarily genetic algorithms and genetic programming, but also including such things as evolution strategies and evolution programming. These approaches have in common the use of a population of candidate solutions. Each of the candidates in the population is presented with training cases to solve. For example, candidates in the population may be presented with the input data of a training case and prompted to make a prediction. The predictions are compared with the desired target outputs of the training cases and from the error in the prediction, a fitness value for the candidate is determined. Such fitness values might include the mean relative error or prediction accuracy, for example. Typically each candidate solution will be presented with each training case. In some situations, each candidate solution will be presented with a subset of the available training cases. For example, if the set of available training cases is large, it may be computationally infeasible to evaluate each candidate solution in the context of each training case. In addition, presentation of all or most of training cases may lead to "overfitting the data." In such a situation, the solution developed is valid for the cases within the training case set, but may be unable to generalize to cases outside the training case set.

SUMMARY OF THE INVENTION

The present invention involves methods and systems for modifying difficulty measures of training cases used to develop candidate solutions for a problem. In accordance with various embodiments of the invention, a method includes providing a set of training cases having respectively associated difficulty measures. A candidate solution may operate in the context of a particular training case and the performance measure of the candidate solution is obtained. A credibility rating of the candidate solution may also determined. The credibility rating indicates the degree to which the performance measure represents a good estimator of the difficulty measure of the particular training case. The difficulty measure of the particular training case may be modified based on the performance measure and the credibility rating.

Various embodiments are set forth in the Detailed Description and Claims that follow.

DETAILED DESCRIPTION

Figure 1:
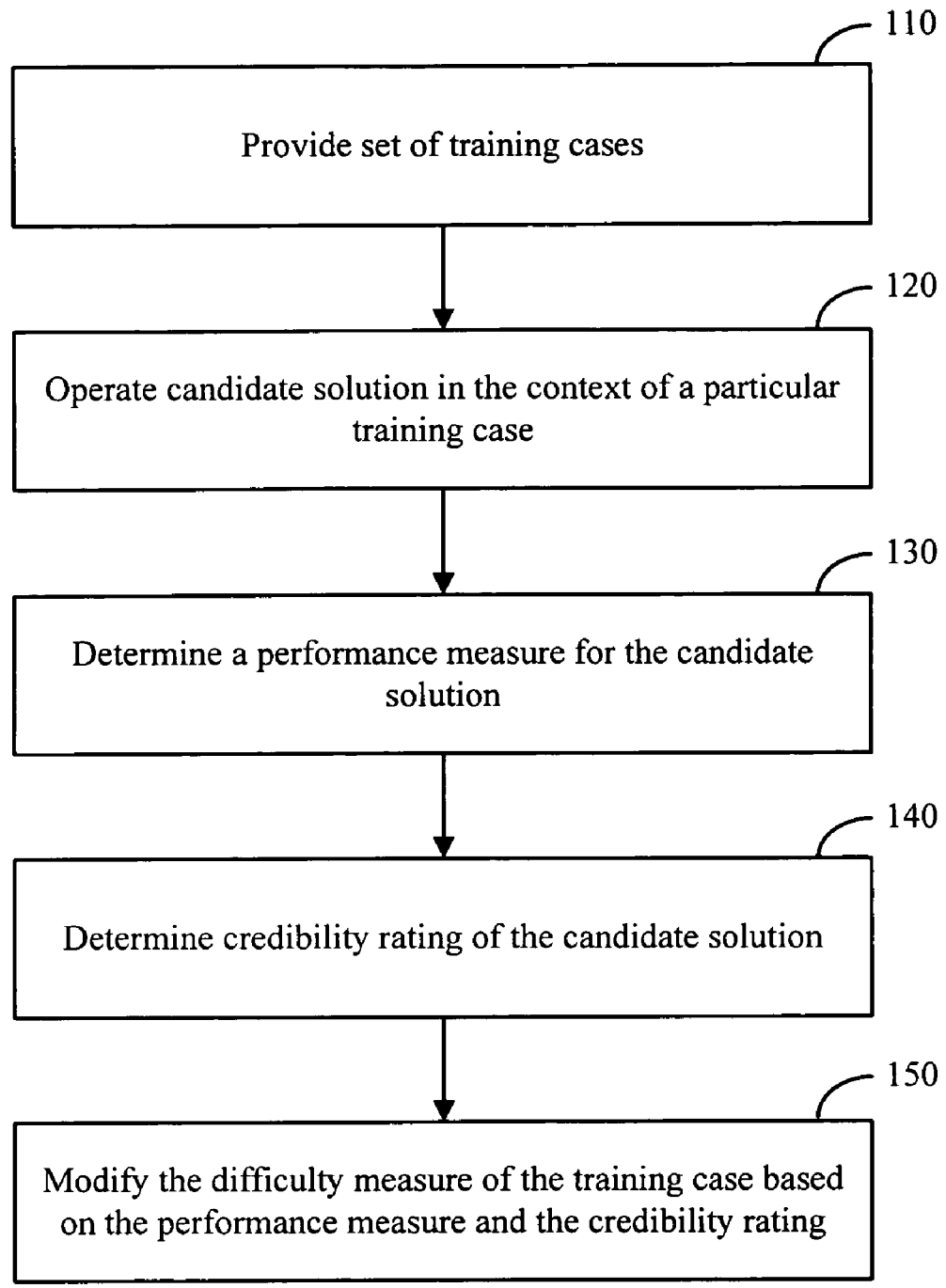
FIG. 1 is a flow chart illustrating a method of modifying a difficulty measure of a particular training case in accordance with embodiments of the invention.

Various methods for developing a solution to a problem involve the use of machine learning. Machine learning may be implemented, for example, through evolutionary computation, involving the methodologies of genetic algorithms and genetic programming and also including techniques such as evolution strategies and evolution programming. Each of these approaches uses populations of candidate models to develop problem solutions. Other known methods for machine learning include neural networks, reinforcement learning, support vector machines, and rule learning.

Machine learning often involves operating candidate solutions operating in the context of the one or more training cases. The training cases typically have a set of input conditions and a corresponding target output. The observed output of a candidate model on a particular training case is compared to the target output. The error between the target output and the output of the candidate solution represents a performance measure for the candidate solution.

A set or population of candidate solutions may be modified based on information acquired by operating the candidate models on the training cases. In one implementation, one or more of the candidate solutions in a set of candidate solutions may be modified based on the performance measures. In another implementation, the set of candidate solutions may be modified by the addition or removal of candidate solutions. In one approach, a new population of candidate solutions may be formed. The process of modifying the candidate solutions or the population of candidate solutions may continue iteratively until a termination condition is reached.

The number of available training cases used to develop the candidate solutions may vary. In one application, each of the candidate solutions may be presented with each training case. However, the number of available training cases may be prohibitively large, making the presentation of every training case to each candidate computationally infeasible. In such a scenario, candidates may be presented with a subset of the available training cases. Further, presentation of fewer training cases to the candidate population may avoid development of a solution that is valid for the cases within the training case set, but does not generalize to cases outside the training case set. Such a situation is referred to as "overfitting the data."

In accordance with embodiments of the invention, the selection of training cases presented to the candidate models is biased toward selecting training cases that are more difficult for the candidates of the population to solve. Biasing the selection of the training cases takes into account the premise that evolutionary computation produces models that become proficient at solving the training cases presented. However, there is a distribution for how well a candidate solves the training cases. In other words, a candidate model may perform well if presented with some training cases and less well if presented with other training cases. Biasing the selection of the training cases towards selection of more difficult training cases enhances the development of solutions that are proficient at solving more difficult problems. Candidate solutions that are able to solve the more difficult training cases proficiently may be better able to generalize and produce more accurate results when presented with a real (non-training) problem.

Selection of training cases biased toward more difficult training cases is a dynamic process. As candidate solutions are presented with difficult training cases, the candidate solutions learn how to solve the difficult training cases. As the candidate solutions learn, the more difficult cases become easier to solve, and these cases will be determined to be less difficult and thus will be selected less often. At the same time, cases which had been less difficult in the past will have been seen less frequently and may become more difficult as candidates learn to solve the cases that had been more difficult. The difficulty of all the training cases will tend toward convergence, wherein all training cases are determined to be equally difficult to solve. In this situation, the best candidate solutions perform equally well on all training cases and are likely to generalize to other similar cases.

Embodiments of the invention involve associating training cases with difficulty measures used to indicate the difficulty of the associated training case. The difficulty measure associated with a particular training case is an estimate of how difficult the particular training case is for a relatively good candidate solution in the population to solve. The difficulty measure may be modified based how well candidate solutions perform when solving the particular training case. Modification of the difficulty measure may additionally be based on how good the candidate solution is at solving other training cases. The latter factor is characterized herein by a credibility rating that indicates the degree to which the candidate solution's performance at solving the training case is a good estimator of the difficulty of the training case for a relatively good candidate solution in the current population.

The flow chart of FIG. 1 illustrates a method of modifying difficulty measures associated with training cases used in the development of a solution to a problem in accordance with embodiments of the invention. A set of training cases is provided 110 and associated with a target output and a difficulty measure. The difficulty measure for a particular training case represents, for example, a measure of the expected relative error produced by a candidate model operating on the particular training case. In one implementation, each training case, f, has an associated difficulty measure, $d_f$, that may range from $d_{min}$ to $d_{max}$. For example, the difficulty measure may range from a minimum difficulty value, $d_{min}$=0, representing perfect prediction to a maximum difficulty value, $d_{max}$=1, representing a prediction error greater than or equal to 100%. In other examples, different ranges for the difficulty measures may be chosen.

The difficulty measures of the training cases may be initialized to a predetermined value. For example, the difficulty measures of the training cases may be initialized to the maximum difficulty measure, $d_{max}$. Initializing the difficulty measures of all the training cases to a maximum value makes it more likely that untried cases will be selected.

A candidate solution for the problem is operated 120 in the context of a particular training case. The output of the candidate solution is compared to the target output of the particular training case. A performance measure of the candidate solution operating on the particular training case is determined 130. The performance measure for the candidate solution may represent, for example, a deviation between the output of the candidate solution and the target output of the training case. The performance measures employed in the examples provided herein are described in terms of an error between an observed prediction output and a target output. Alternatively, or additionally, other measures of performance may be used. For example, performance measures may be based on a measure of real time, an estimate of simulated time, a measure of resources consumed, a measure of resources produced, an environmental measurement, or other parameters. In some embodiments, a performance measure may be a computed value based on one or more other performance measures.

In the context of this specification the statements that a candidate "operating on a training case" and "operating in the context of the training case" may be read as identical. In some embodiments the training case may specify inputs to the candidate solution, while in other embodiments the training case may specify, among other things, attributes of the environment in which the candidate solution operates, problems for it to solve, or adversaries for it to face. A candidate solution may operate in the context of one training case at a time or multiple training cases at the same time.

Further, various techniques may be used to determine the deviation between the output of the candidate model and the target output. A representative set of techniques that may be used to calculate the deviation may include calculating an absolute difference, a relative difference, a square difference, and a log difference, for example.

The credibility rating of the candidate solution is determined 140. The credibility rating indicates a proficiency of the candidate solution at solving training cases. More specifically, the credibility rating indicates the degree to which the performance measure of the candidate solution operating in the context of the particular training case represents a good estimator of the difficulty measure of the particular training case. In a preferred embodiment, the credibility rating (CR) is associated with the proficiency the candidate solution has demonstrated in solving training cases other than the particular training case. The credibility rating (CR) may be determined by selecting one or more training cases from the set of training cases and operating the candidate solution in the context of each of the one or more training cases. The performance measures of the candidate solution operating on each of the training cases are determined. The credibility rating of the candidate solution is computed based on the performance measures. In one embodiment, a set of training cases is chosen for each candidate solution based on the respective difficulty measures of the training cases. A performance measure is obtained for a candidate solution operating in the context of each training case selected. A credibility rating for the candidate solution with respect to each training case seen by the candidate solution is computed based on the performance measures observed for the candidate solution operating in the context of the other training cases.

The difficulty measure of the particular training case is modified 150 based on the performance measure of the candidate solution operating on the particular training case and the credibility rating of the candidate solution. For example, the performance measure of the candidate solution may be calculated as the output error, $e_f$, of the candidate solution operating on the particular training case, f The output error, $e_f$, represents the deviation between the candidate solution output and the target output of the particular training case.

The credibility rating of the candidate solution with respect to the particular training case may be calculated, for example, as an average error the candidate solution produced when operating on one or more training cases excluding the particular training case. For this example, the credibility rating ($CR_f$) of the candidate solution may be calculated as:

$$CR_f = 1 - \frac{1}{|C|-1} \sum_{c \neq f} e_c, \qquad [1]$$

where C is the subset of training cases, c, operated on by the candidate solution, f is the particular training case, and $e_c$ is the error produced by the candidate model operating on a training case, c, that is different from the selected training case, f.

In other embodiments, the credibility rating may be obtained by other means. In some embodiments, the credibility rating may be derived from a separate evaluation phase of the candidate solution. For example, if the candidate solution is an agent that is to navigate a maze, the training cases might represent small sections of mazes, with the performance measure being the amount of time taken to navigate the small section. The credibility rating with respect to all of the training cases seen might be based on the amount of time the candidate solution takes to solve a complete randomly-generated maze.

The difficulty measure of the particular training case may be modified based on a weighted average of the performance measure of the candidate solution operating on the particular training case and the previous value of the difficulty measure. A weight of the weighted average may be based on the credibility rating and a base learning rate.

In one example, a modified difficulty measure, $d'_f$, may be determined according to an equation of the form:

$$d'_f = d_f(1-\alpha_f) + e_f \alpha_f \qquad [2]$$

where $\alpha_f$ is a dynamic learning rate, $e_f$ is the observed error in the candidate solution's prediction of the training case, f, and $d_f$ is the previous difficulty measure. In this example, the dynamic learning rate, $\alpha_f$, may be characterized by Equation 3 below:

$$\alpha_f = \beta \times CR_f \qquad [3]$$

where $\beta$ is a constant base learning rate.

If the error produced by the candidate solution when predicting cases other than the selected training case is high, the credibility rating of the candidate solution is low. The dynamic learning rate, $\alpha_f$, will be correspondingly low, even if the candidate solution happened to perform well when operating in the context of the particular training case. In this situation, the candidate solution may have happened to do well on the training case by accident.

If, on the other hand, the error produced by the candidate solution when operating in the context of cases other than the particular training case is low, the candidate solution is a relatively good solution, and the credibility rating of the candidate solution is relatively high. The performance measure of the candidate solution operating on the particular training case is a good estimator of the current difficulty of the selected training case. In this scenario, the dynamic learning rate, $\alpha_f$, will be close to the base learning rate, $\beta$, and the difficulty measure for the particular training case will be adjusted a larger amount in the direction of the candidate solution's error, $e_f$. If an otherwise proficient candidate solution performs well with respect to a training case, it may imply that the training case is relatively easy. If an otherwise proficient candidate solution performs poorly with respect to a selected training case, it may imply that the training case is relatively difficult.

The process of developing the candidate solutions using the training cases may continue iteratively until a termination condition is achieved. The difficulty measures of the training cases are likely to change over the course of the iterations. The base learning rate, $\beta$, may be relatively small, e.g., 0.1, so that no individual candidate solution can drastically alter the difficulty measure of a training case. Over the course of the iterations, a difficulty measure emerges that reflects the difficulty of a training case for candidate solutions that are otherwise proficient at solving the training cases.

Figure 2:
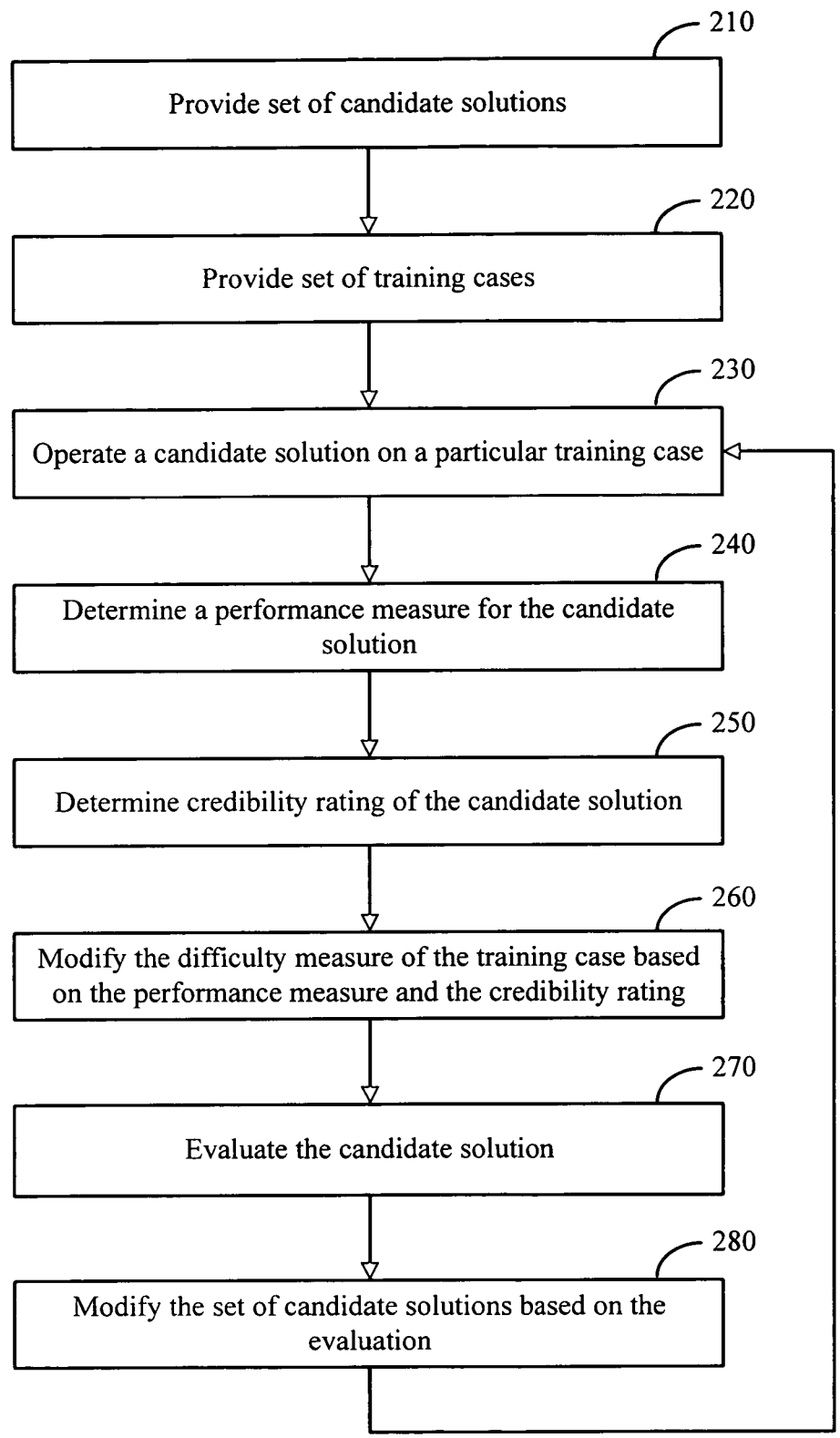
FIG. 2 is a flow chart illustrating a method for developing a solution to a problem in accordance with embodiments of the invention.

Various embodiments of the invention are directed to methods for solving problems using training cases selected based on their difficulty measures. The flow chart of FIG. 2 illustrates one such method. In accordance with this embodiment, a set of candidate solutions and a set of training cases having respectively associated difficulty measures are provided 210, 220. A candidate solution is operated 230 in the context of a particular training case. A performance measure of the candidate solution operating on the particular training case is determined 240. As previously discussed, the performance measure may represent a deviation between the output of the candidate solution operating on the particular training case and the target output of the training case.

A credibility rating for the candidate solution with respect to the particular training case is determined 250. The credibility rating indicates a degree to which the performance measure is a good estimator of the difficulty measure of the particular training case. As previously discussed, the credibility rating may comprise, for example, an average error the candidate solution produced when operating on one or more of the training cases. The one or more training cases preferentially exclude the particular training case.

The difficulty measure of the particular training case is modified 260 based on the performance measure of the candidate solution operating on the particular training case and the credibility rating of the candidate solution with respect to the particular training case. For example, the difficulty measure may be modified as described in connection with FIG. 1 above.

The candidate solution is evaluated 270 and the set of candidate solutions is modified 280 based on the evaluation. The candidate solution may be evaluated, for example, using training cases that are relatively more difficult to solve than other training cases in the set of training cases. In one implementation, one or more training cases are selected based on the difficulty measures of the one or more selected training cases. As previously discussed, each of the training cases in the set of training cases is associated with a target output. The candidate solution is evaluated by operating the candidate solution on each of the one or more selected training cases and obtaining performance measures for the candidate solution with respect to each of the one or more selected training cases as described above. In some embodiments, the performance measure used for modifying the difficulty measures of the training cases will be different from the performance measure used for evaluating the candidate solutions. In a preferred embodiment, a single set of one or more training cases is chosen for each candidate solution and the performance measures used for modifying the difficulty measures and for evaluating the candidate solutions are obtained from the same instances of evaluating the candidate solutions in the context of the selected training cases.

In another embodiment, the training cases may be used for an initial learning or development phase for the individual candidate solutions, while the evaluation of the candidate solution is taken from its performance on another task, which may be similar to or different from the training cases.

In a preferable embodiment, the training case selection is biased toward cases that are estimated to be more difficult for relatively good candidates in the set of candidate solutions to solve. The selection of training cases biased in such a way may be implemented through various processes. In one approach, each of the one or more training cases is selected from a subset of randomly chosen training cases. The subset of randomly chosen training cases may include, for example, three training cases. The training case is selected from the subset based on the difficulty measure of the selected training case. For example, the selected training case may have the highest difficulty measure in the subset.

In another approach, a subset of training cases may be chosen from the set of training cases based on the difficulty measures of the training cases in the subset. In one example, the subset of training cases may comprise the top 20% of training cases in the set ranked by difficulty measure. The training case is selected from the subset. This secondary selection may be random or may be based on another method such as one of the methods disclosed here for selecting from the whole set of training cases.

In yet another approach, the training case is selected based on a probability computed as a function of the difficulty measure of the selected training case and the difficulty measures of the members of the set of training cases. For example, the difficulty measures for all of the training cases in the set may be summed and the probability of any given case being chosen is the ratio of its difficulty measure to the sum. In some embodiments it may be desirable to first adjust each difficulty measure, for instance to ensure that the adjusted difficulty measures are all positive.

Figure 3:
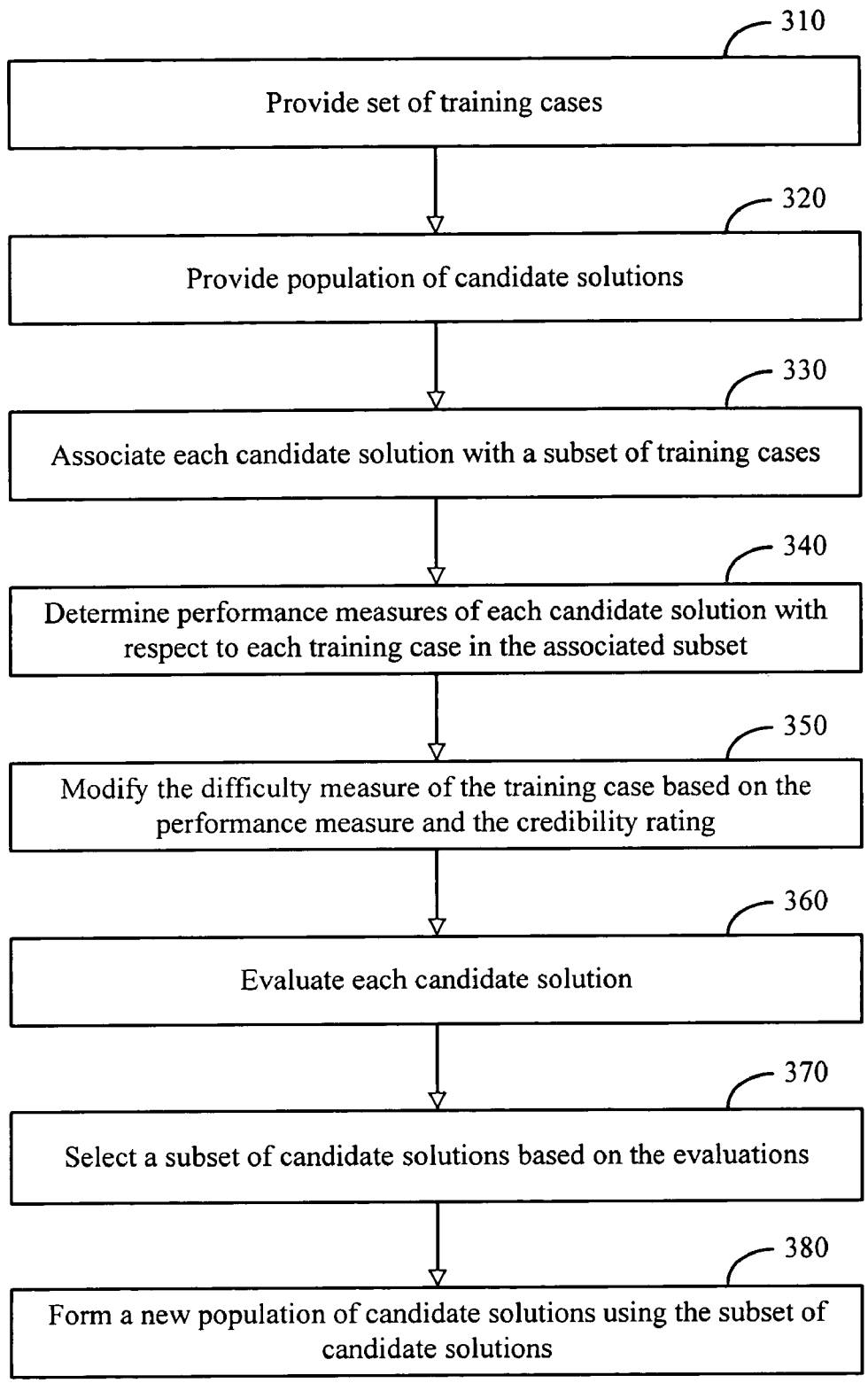
FIG. 3 is a flow chart illustrating a method for determining a solution to a problem involving forming a new population of candidate solutions as a part of an evolutionary computation approach in accordance with embodiments of the invention.

As illustrated in the flow chart of FIG. 3, various embodiments of the invention involve methods for solving problems using an evolutionary computation approach based on a population of candidate solutions. The candidate solutions are evaluated using training cases selected based on difficulty measures associated with the training cases. The difficulty measures of the training cases are modified based on how difficult the training cases are for the candidates solutions to solve.

As illustrated in FIG. 3, a set of training cases is provided 310, wherein each training case is associated with a target output and a difficulty measure. As previously described, the difficulty measures may have a range between $d_{min}$ and $d_{max}$ and may be initialized to a predetermined value, e.g., $d_{max}$.

The method includes providing 320 a population of candidate solutions. The population of candidate solutions may exclude candidate solutions rejected on pre-evaluation grounds, for example. A candidate solution may be rejected on pre-evaluation grounds if the candidate solution is too complex, ill-formed, or for other reasons. Each of the candidate solutions in the population is associated 330 with a subset of training cases selected based on the difficulty measures of the training cases. For example, training case selection may be accomplished using methods similar to the training case selection processes described in connection with FIG. 2. In a preferable embodiment, an initial subset of training cases is randomly selected from the set of training cases. The subset of training cases is selected from the initial subset based on the difficulty measures of the training cases.

Performance measures are determined 340 for each of the candidate solutions with respect to each of the training cases within the associated subset of training cases. A performance measure of a candidate solution with respect to a training case may be determined as previously described. For example, the candidate solution may be operated in the context of a training case and the candidate solution output compared with the target output of the training case. For example, the performance measure may be value representing a deviation between the candidate solution output and the target output. Determination of performance measures for a candidate solution with respect to training cases in the associated subset of training cases may be stopped if some termination condition is reached. Termination conditions may include, for example, the candidate solution exceeding an evaluation budget, the candidate solution encountering an exceptional condition, and/or determination of performance measure indicating that the candidate solution would not be selected to form a new population.

The difficulty measure of a particular training case within the subset of training cases associated with a particular candidate solution may be modified 350 based on the performance measure of the particular candidate solution with respect to the particular training case. In one implementation, the modified value of the difficulty measure, $d'_f$, may be calculated as follows:

$$d'_f \leftarrow d_f(1-\alpha)+e_f\alpha \quad [4]$$

where $d_f$ is the previous value of the difficulty measure, $e_f$ is the observed error in the candidate solution's prediction of a training case, f clipped to be between $d_{min}$ and $d_{max}$, and $\alpha$ is the learning rate. Using this equation, the difficulty measure of f is moved $\alpha$ of the way between the previous estimate of the difficulty measure, $d_f$, and the new estimate of the difficulty measure, $d'_f$. The learning rate a may be a constant or may be based on a credibility rating of the candidate solution with respect to f as described above.

Each of the candidate solutions is evaluated 360 using the associated subsets of the training cases. The evaluations may be based on performance measures of the candidate solutions operating in the context of training cases in the associated subset. As noted above, the performance measures used for modifying the difficulty measures may differ from those used to evaluate the candidate solutions. In accordance with the evolutionary approach, a subset of the candidate solutions is selected 370 based on the evaluations of the candidate solutions. For example, the candidate solutions chosen may represent the candidate solutions in the population that are the best at solving the problem. A new population of candidate solutions is formed 380 using the selected subset of candidate solutions and known-method genetic operators. This process may continue until a terminal condition is achieved.

Figure 4A:
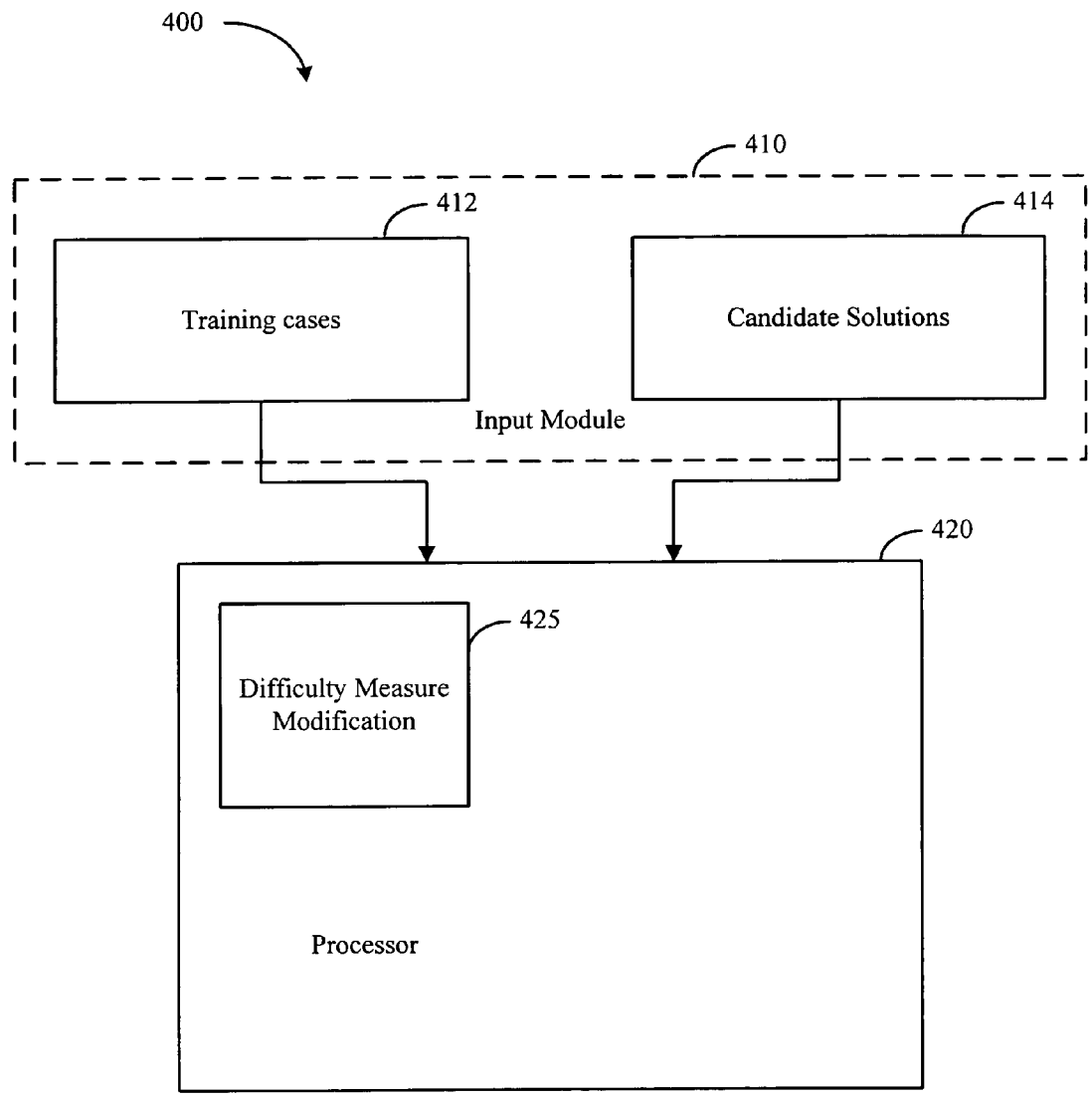
FIG. 4a is a conceptual block diagram of a system that may be used to modify difficulty measures of training cases in accordance with embodiments of the invention.
Figure 4B:
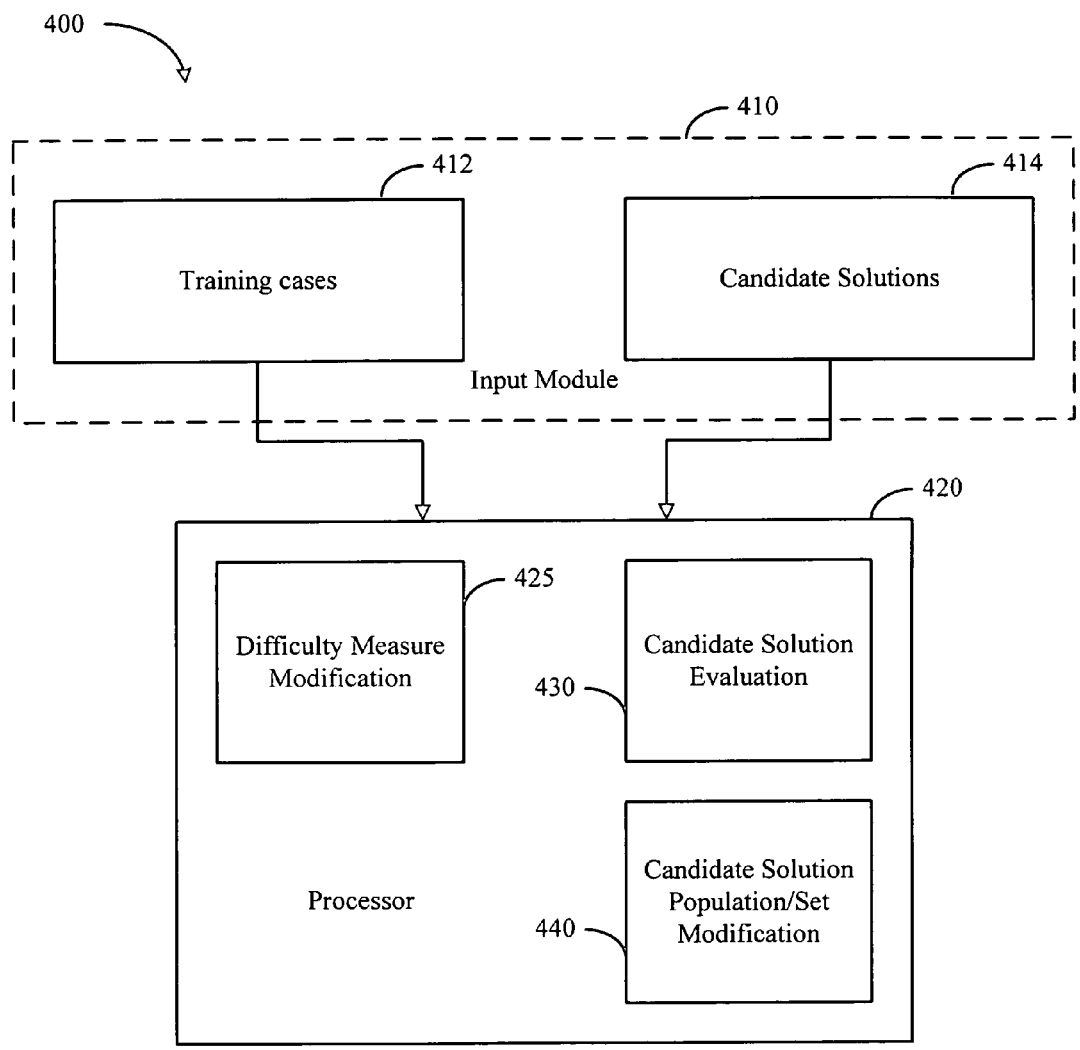
FIG. 4b is a conceptual block diagram of a system that may be used to develop a solution to a problem in accordance with embodiments of the invention.

FIGS. 4a and 4b are block diagrams of systems that may be used to implement methods in accordance with embodiments of the invention. As illustrated in FIG. 4a, a system 400 configured to modify difficulty measures of training cases is depicted. The system 400 includes an input section 410 configured to provide a set of training cases 412 and a set or population of candidate solutions 414. A processor 420 coupled to the input section 410 is configured to operate a candidate solution in the context of a particular training case to determine the performance measure of the candidate solution with respect to the particular training case. The processor 420 may be further configured to determine a credibility rating of the candidate solution indicating a degree to which the performance measure is a good estimator of the difficulty measure of the particular training case.

The processor includes a module 425 configured to modify the difficulty measure of the particular training case. In one embodiment, the difficulty measure of the particular training case is modified based on the performance measure. In other embodiments, the difficulty measure of the training case may be modified based on the performance measure and the credibility rating.

As illustrated in FIG. 4b, the system 400 may be further configured to include modules 430, 440 configured to evaluate the candidate solutions and modify the set or population of candidate solutions based on the evaluations. Modification of the set or population of candidate solutions may involve, for example, by modifying one or more of the candidate solutions in the set of candidate solutions or by modifying the set or population of candidate solutions, such as by forming a new population of candidate solutions based on a subset of the previous population of candidate solutions.

In addition to the embodiments described above, other aspects and embodiments of the present invention will be apparent to those skilled in the art from consideration of the specification and practice of the invention disclosed herein. It is intended that the specification and illustrated embodiments be considered as examples only, with a true scope of the invention being indicated by the following claims.

What is claimed is:

1. A processor-based method for determining difficulty measures for training cases used in developing a solution to a problem, comprising:
providing a set of training cases having respectively associated difficulty measures;
operating, by a processor, a candidate solution on a particular training case;
determining, by the processor, a performance measure of the candidate solution operating on the particular training case;
determining, by the processor, a credibility rating of the candidate solution with respect to the particular training case, the credibility rating indicating a degree to which the performance measure is representative of the difficulty measure of the particular training case, wherein determining the credibility rating of the candidate solution with respect to the particular training case is based on inputs that exclude the performance measure of the candidate solution operating on the particular training case; and
modifying, by the processor, the difficulty measure of the particular training case based on the performance measure of the candidate solution operating on the particular training case and the credibility rating of the candidate solution.

2. The method of claim 1, wherein determining the credibility rating comprises:
selecting one or more training cases other than the particular training case from the set of training cases based on the difficulty measures of the one or more training cases;
determining performance measures of the candidate solution operating on each of the selected one or more training cases; and
computing the credibility rating based on the performance measures of the candidate solution operating on each of the selected one or more training cases that do not include the particular training case.

3. The method of claim 1, wherein providing the set of training cases having respectively associated difficulty measures comprises initializing a difficulty measure of each training case in the set of training cases to a predetermined value.

4. The method of claim 3, wherein the predetermined value is a maximum value.

5. The method of claim 1, wherein modifying the difficulty measure of the particular training case comprises modifying the difficulty measure based on a weighted average of the performance measure and a previous value of the difficulty measure.

6. The method of claim 5, wherein:
providing the set of training cases comprises associating each training case in the set of training cases with a target output;
operating the candidate solution on the particular training case comprises obtaining an output from the candidate solution operating on the particular training case; and
determining the performance measure of the candidate solution operating on the particular training case comprises comparing the candidate solution output to a target output of the particular training case.

7. The method of claim 6, wherein comparing the candidate solution output to the target output of the particular training case comprises calculating a value corresponding to a deviation between the candidate solution output and the target output of the particular training case.

8. The method of claim 5, wherein a weight of the weighted average is based on the credibility rating and a base learning rate.

9. The method of claim 1, wherein modifying the difficulty measure comprises maintaining the difficulty measure within a predetermined interval.

10. The method of claim 5, wherein the performance measure of the candidate solution operating on the particular training case is computed without including training cases in the set other than the particular training case.

11. The method of claim 1, wherein the training cases represent corresponding sections of a maze, wherein the performance measure of the candidate solution operating on the particular training case is based on an amount of time for the candidate solution to navigate the section of the maze corresponding to the particular training case, and wherein determining the credibility rating is based on an amount of time that the candidate solution takes to solve another maze.

12. The method of claim 11, wherein the another maze is a randomly-generated maze.

13. The method of claim 1, wherein the training cases represent corresponding subtasks of a task, wherein the performance measure of the candidate solution operating on the particular training case is based on a measure characterizing a performance of the candidate solution when performing the subtask corresponding to the particular training case, and wherein determining the credibility rating is based on a measure characterizing a performance of the candidate solution when performing another task.

14. A system comprising:
an input section to provide a set of training cases and a candidate solution, wherein the training cases in the set are respectively associated with difficulty measures; and
a processor to:
operate a candidate solution on a particular one of the training cases;
determine a performance measure of the candidate solution operating on the particular training case;
determine a credibility rating of the candidate solution with respect to the particular training case, the credibility rating indicating a degree to which the performance measure is representative of the difficulty measure of the particular training case, wherein the credibility rating of the candidate solution with respect to the particular training case is determined based on inputs that exclude the performance measure of the candidate solution operating on the particular training case; and modify the difficulty measure of the particular training case based on the performance measure of the candidate solution operating on the particular training case and the credibility rating of the candidate solution.

15. The system of claim 14, wherein the credibility rating is determined by:

selecting one or more training cases other than the particular training case from the set of training cases based on the difficulty measures of the one or more training cases;

determining performance measures of the candidate solution operating on each of the selected one or more training cases; and computing the credibility rating based on the performance measures of the candidate solution operating on each of the selected one or more training cases that do not include the particular training case.

16. The system of claim 14, wherein the difficulty measure of the particular training case is modified based on a weighted average of the performance measure and a previous value of the difficulty measure.

17. The system of claim 16, wherein:

each training case in the set of training cases is associated with a target output;

the candidate solution operating on the particular training case obtains an output; and the performance measure of the candidate solution operating on the particular training cases is determined by comparing the candidate solution output to a target output of the particular training case.

18. The system of claim 17, wherein the candidate solution output is compared to the target output of the particular training case by calculating a value corresponding to a deviation between the candidate solution output and the target output of the particular training case.

19. The system of claim 16, wherein a weight of the weighted average is based on the credibility rating and a base learning rate.

20. The system of claim 14, wherein the performance measure of the candidate solution operating on the particular training case is computed without including training cases in the set other than the particular training case.

21. The system of claim 14, wherein the training cases represent corresponding sections of a maze, wherein the performance measure of the candidate solution operating on the particular training case is based on an amount of time for the candidate solution to navigate the section of the maze corresponding to the particular training case, and wherein the credibility rating is determined based on an amount of time that the candidate solution takes to solve another maze.

22. The system of claim 21, wherein the another maze is a randomly-generated maze.

23. The system of claim 14, wherein the training cases represent corresponding subtasks of a task, wherein the performance measure of the candidate solution operating on the particular training case is based on a measure characterizing a performance of the candidate solution when performing the subtask corresponding to the particular training case, and wherein determining the credibility rating is based on a measure characterizing a performance of the candidate solution when performing another task.

\* \* \* \* \*